(12) United States Patent
Tang

(10) Patent No.: US 10,959,214 B2
(45) Date of Patent: Mar. 23, 2021

(54) INFORMATION PROCESSING METHOD, COMMUNICATION DEVICE, AND COMPUTER STORAGE MEDIUM FOR ENSURING CORRECT GENERATION OF A CHECK BIT

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP. LTD., Guangdong (CN)

( * ) Notice: Subject to any disclaimer, the term of this patent is extended or adjusted under 35 U.S.C. 154(b) by 42 days.

(21) Appl. No.: 16/353,883

(22) Filed: Mar. 14, 2019

(65) Prior Publication Data

US 2019/0215819 A1 Jul. 11, 2019

Related U.S. Application Data

(63) Continuation of application No. PCT/CN2017/096113, filed on Aug. 4, 2017.

(51) Int. Cl.
*H04W 72/04* (2009.01)
*H04L 1/00* (2006.01)
*H04W 92/18* (2009.01)

(52) U.S. Cl.
CPC ......... *H04W 72/0406* (2013.01); *H04L 1/007* (2013.01); *H04L 1/0041* (2013.01);
(Continued)

(58) Field of Classification Search
CPC ..... H04W 24/10; H04W 24/02; H04W 24/08; H04W 72/1268; H04W 72/1289
See application file for complete search history.

(56) References Cited

U.S. PATENT DOCUMENTS 7,315,894 B2 1/2008 Huntington et al.
7,343,487 B2 3/2008 Lindqvist et al.
(Continued)

FOREIGN PATENT DOCUMENTS

CN 101483441 A 7/2009
CN 104170487 A 11/2014
(Continued)

OTHER PUBLICATIONS

ZTE, Discussion on PC5 carrier aggregation, 3GPP TSG-RAN WG2 Meeting #99 R2-1708509, Berlin, Germany, Aug. 21-25, 2017 (Year: 2017).*

(Continued)

*Primary Examiner* — Mounir Moutaouakil
(74) *Attorney, Agent, or Firm* — Ladas & Parry LLP

(57) ABSTRACT

The present application discloses an information processing method for use in a communication device, including: obtaining a side-ink control information SCI, where the SCI includes a first bit sequence; setting a bit in the specified field of the first bit sequence to be a preset value to generate a second bit sequence; obtaining a check sequence based on the second bit sequence. The embodiment of the present application further provides a communication device and a computer storage medium.

17 Claims, 4 Drawing Sheets

(52) U.S. Cl.
CPC .......... *H04L 1/0045* (2013.01); *H04L 1/0061* (2013.01); *H04L 1/0072* (2013.01); *H04W 92/18* (2013.01)

(56) References Cited

U.S. PATENT DOCUMENTS

| | | | | |
|---|---|---|---|---|
| 9,398,483 | B2* | 7/2016 | Behravan | H04B 7/0632 |
| 9,686,783 | B1 | 6/2017 | Patel et al. | |
| 9,794,014 | B2* | 10/2017 | Seo | H04W 16/10 |
| 9,872,244 | B2* | 1/2018 | Yi | H04W 48/20 |
| 9,973,243 | B2* | 5/2018 | Zhang | H04B 7/024 |
| 9,979,456 | B1* | 5/2018 | Akoum | H04B 7/0626 |
| 10,079,741 | B2* | 9/2018 | Park | H04L 43/067 |
| 10,142,851 | B2* | 11/2018 | Tao | H04W 16/14 |
| 10,581,575 | B2* | 3/2020 | Baghel | H04L 5/0048 |
| 2005/0160095 | A1* | 7/2005 | Dick | H04L 69/329 |
| 2015/0100856 | A1 | 4/2015 | Zhang et al. | |
| 2015/0208263 | A1* | 7/2015 | Behravan | H04L 5/0057 370/252 |
| 2017/0033910 | A1 | 2/2017 | Ogawa et al. | |
| 2017/0339593 | A1* | 11/2017 | Sun | H04L 5/0051 |
| 2018/0049073 | A1* | 2/2018 | Dinan | H04W 72/1257 |
| 2018/0062809 | A1* | 3/2018 | Baghel | H04L 1/0061 |
| 2020/0037126 | A1* | 1/2020 | Lee | H04L 27/2605 |
| 2020/0120674 | A1* | 4/2020 | Lee | H04W 72/02 |
| 2020/0128572 | A1* | 4/2020 | Dinan | H04W 72/1263 |
| 2020/0236666 | A1* | 7/2020 | Yu | H04W 72/0446 |

FOREIGN PATENT DOCUMENTS

| | | |
|---|---|---|
| CN | 104396296 A | 3/2015 |
| CN | 106797324 A | 5/2017 |
| WO | 2015053969 A1 | 4/2015 |
| WO | 2016163972 A1 | 10/2016 |
| WO | 2017/011980 A1 | 1/2017 |

OTHER PUBLICATIONS

Huawei, HiSilicon, Discussion on V2V synchronization from RRM perspective, 3GPP TSG-RAN WG4 Meeting #79 R4-164075, Nanjing, China, May 23-27, 2016 (Year: 2016).*
Extended European Search Report dated Sep. 20, 2019, Appln. No. 17919876.7.
The first Examination Report of parallel CN application dated Dec. 9, 2019, Appln. No. 201780051389.4.
The first Examination Report of parallel TW application dated Oct. 18, 2019, Appln. No. 10820986160.
Samsung: "Discussion on the impacts of Tx diversity transmission", R1-1707911_TX Dicersity Impact, 3GPP, Mobile Competence Centre; 650, Route Des Lucioles; F-06921 Sophia-Antipolis Cedex; France, vol. RAN WG1, No. Hangzhou, China; May 15, 2017-May 19, 2017 May 14, 2017 (May 14, 2017).
Huawei et al: "System design principles for R15 PC5 functionality", R1-1704277, 3GPP, Mobile Competence Centre; 650, Route Des Lucioles; F-06921 Sophia-Antipolis Cedex; France; vol. RAN WG1, No. Spokane, USA; Apr. 3, 2017- Apr. 7, 2017 Apr. 2, 2017 (Apr. 2, 2017).
Samsung: "Discussion on UE behavior when receiving inconsistent SCI", R1-1705261; 3GPP; Mar. 25, 2017.
The Notice of Allowance of corresponding Chinese application No. 201780051389.4, dated Apr. 26, 2020.
International Search Report (ISR) and Written Opinion (WO) dated Mar. 1, 2018 for Application No. PCT/CN2017/096113.
"3rd Generation Partnership Project; Technical Specification Group Radio Access Network; Evolved Universal Terrestrial Radio Access (E-UTRA); Multi-plexing and Channel Coding (Release 14)", 3GPP TS 36.212 V14.3.0 (Jun. 2017), Jun. 30, 2017 (Jun. 30, 2017), sections 5.1.1, 5.3.3.2 and 5.4.3.
espacenet English abstract of CN 101483441 A.
English abstract of WO 2017/011980A1.

* cited by examiner

INFORMATION PROCESSING METHOD, COMMUNICATION DEVICE, AND COMPUTER STORAGE MEDIUM FOR ENSURING CORRECT GENERATION OF A CHECK BIT

CROSS-REFERENCE TO RELATED APPLICATION

This application is a continuation of International Application No. PCT/CN2017/096113, filed on Aug. 4, 2017, the disclosure of which is hereby incorporated by reference in its entirety.

TECHNICAL FIELD

The present application relates to the field of mobile communication technologies and, in particular, to an information processing method, a communication device, and a computer storage medium.

BACKGROUND

End-to-end communication refers to direct communication between two communication terminals without an intermediate network device. The end-to-end communication includes device to device (D2D) communication, and vehicle to Everything (V2X) communication. The V2X may further include: vehicle to vehicle (V2V) communication, vehicle to person (V2P) communication, and a vehicle to infrastructure (V2I) communication.

In some communication scenarios, a physical side-link shared channel (PSSCH) is used in the case of an end-to-end communication. However, control information of the PSSCH is sent through a physical side-link control channel (PSCCH). The control information is referred to side-link control information (SCI).

In Rel-14 communication standards, a certain information format is predefined for the SCI; however, with the development of communication technologies, the SCI needs to indicate more information, which inevitably cause a change in information carrying of the SCI with respect to the original information format. This change may further cause a change and thus an abnormality to occur in a check sequence dependent on the information carrying of the SCI. Therefore, solving the abnormality caused by the change in the information carrying of the SCI is an urgent problem to be solved in the prior art.

SUMMARY

In view of the above, embodiments of the present application are intended to provide an information processing method, a communication device, and a computer storage medium, which at least partially solve a problem of an abnormality in generation of a check sequence caused after a change in information carrying of SCI.

The technical solutions of the embodiments of the present application are implemented as follows:

in a first aspect, an embodiment of the present application provides an information processing method for use in a communications device, including:

obtaining an SCI, where the SCI includes a first bit sequence;

setting a bit in a specified field of the first bit sequence to be a preset value to generate a second bit sequence; and obtaining a check sequence based on the second bit sequence.

In a second aspect, an embodiment of the present application provides a communication device, including:

a first obtaining unit, configured to obtain an SCI, where the SCI includes a first bit sequence;

a generating unit, configured to set a bit in a specified field of the first bit sequence to be a preset value to generate a second bit sequence; and a second obtaining unit, configured to obtain a check sequence based on the second bit sequence.

In a third aspect, an embodiment of the present application provides a communication device, including: a transceiver, a memory, a processor, and a computer program stored on the memory and executed by the processor;

where the processor is respectively connected to the transceiver and the memory, and is configured to control information transmission and reception of the transceiver and information storage of the memory, and implement the above information processing method.

In a fourth aspect, an embodiment of the present application further provides a computer storage medium, where the computer storage medium stores a computer program therein; and the computer program, after executed by a processor, can implement the above information processing method.

The information processing method, the communication device, and the computer storage medium provided by the embodiments of the present application, when generating the check sequence, may set the bit in the specified domain of the original bit sequence of the SCI (i.e., the first bit sequence) to be the preset value, thereby generating a second bit sequence. The check sequence such as a CRC is generated using the second bit sequence. In this case, the SCI can change the information carrying of the SCI as needed, and use, for example, a reserved bit of a reserved domain of the SCI to carry more control information, and at the same time, when generating the check bit such as the CRC, a value of the bit in the specified domain is set to be the preset value, thus the check sequence can be generated in the original manner, so as to solve the problem of an abnormality or error in generation of the check bit caused by the change in the information carrying of the SCI, thereby ensuring the correct generation of a check bit while achieving good compatibility with the prior art.

DESCRIPTION OF EMBODIMENTS

Figure 1:
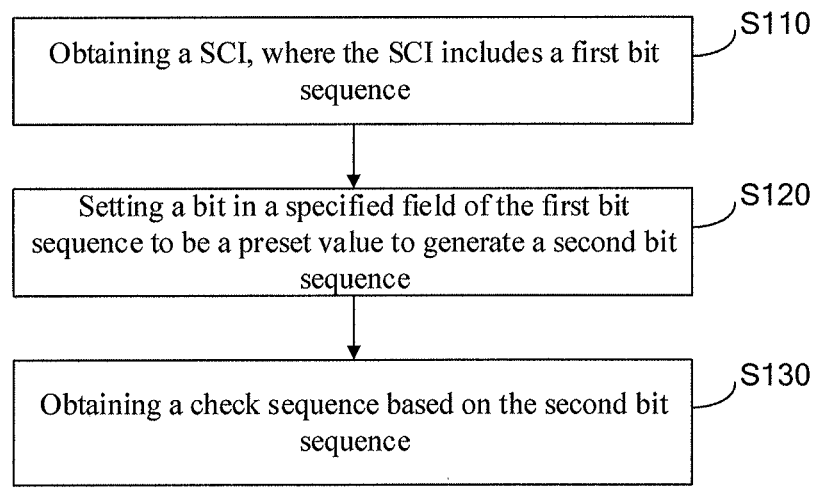
FIG. 1 is a schematic flowchart of an information processing method according to an embodiment of the present application.

SCI is a kind of control signaling for performing PSSCH scheduling, and has a specific information format. For example, in a 3GPP Rel-14 version, SCI format 1 is used for scheduling of a physical side-link shared channel (PSSCH). An information domain and a reserved domain are predefined in the SCI format 1, where the information field is a set of bits, including one or more bits, which has been used to carry various control information. The reserved field is a set of bits including bits, which are reserved for subsequent use. When the reserved field has not been used and the SCI is transmitted, the bits in the reserved field are set to be "0".

The information field may include one or more of the following indication bits:

an indication bit indicating a priority;

an indication bit indicating a frequency domain position of initial transmission and retransmission;

an indication bit indicating a time domain interval between the initial transmission and the retransmission;

an indication bit indicating a modulation and coding format; and an indication bit indicating a retransmission index.

By means of their own bit values being "0" or "1", these indication bits perform transmission of corresponding control information.

In a Rel-14 terminal, generation of a check sequence (for example, a cyclic redundancy heck (CRC sequence)) depends on a bit sequence provided by the SCI, and when the CRC sequence is generated using the bit sequence of the SCI, the bits in the predefined reserved field in the SCI must be set to be "0". In view of this, an embodiment of the present application provides a method in which, after receiving the SCI, an original bit sequence of the SCI is obtained, and then a bit in a specified field of the original bit sequence is set to be a preset value required to generate a check sequence such as a CRC sequence, which is equivalent to that a new bit sequence is generated on the basis of the original bit sequence of the SCI, and then the check sequence is generated using the new bit.

In this case, on the one hand, the reserved domain of the SCI can be used for the transmission of the control information; on the other hand, in the case of a communication mechanism compatible with the Rel-14 terminal, the check sequence is normally generated to solve an abnormality in generation of the check sequence caused by a change in SCI information carrying.

The check sequence herein is one or more bits for information checking. By means of the check sequence, it can be determined whether an abnormality occurs in the generation and/or transmission of the information; in some cases, the check sequence has a certain correction function, and can, after detecting that an error occurs in a corresponding information, perform an error correction on the corresponding information based on generation principle and checking result of the information, thereby reducing information retransmission. The preferred embodiments of the present application are described in detail below with reference to the accompanying drawings. It should be understood that the following described preferred embodiments are intended to illustrate and explain, rather than limiting the present application.

The embodiment provides an information processing method for use in a communication terminal. The communication terminal can be various communication devices in an end-to-end communication, for example, a communication terminal or a roadside communication unit. As shown in FIG. 1, the information processing method includes:

Step S110, obtaining an SCI, where the SCI includes a first bit sequence;

Step S120: setting a bit in a specified field of the first bit sequence to be a preset value to generate a second bit sequence; and Step S130: obtaining a check sequence based on the second bit sequence. The check sequence herein can be a CRC sequence.

In the embodiment, the terminal may be a transmitting device of the SCI, or may be a receiving device of the SCI, and the communication device may be an on-board terminal, a human carried terminal, or a roadside unit.

In Step S110, if the communication device is a transmitting device, the Step S110 may generate the SCI according to the communication device's requirement for the data transmission, and the Step S110 may include: generating the SCI according to the communication device's requirement for information transmission. When the communication device is a receiving device, the Step S110 may include: receiving the SCI from a transmitting device. The SCI is used to schedule traffic data transmission of the PSSCH.

In this implementation, if it is necessary to generate the check sequence based on the SCI, the check sequence is generated by converting all bits in the specified field in the first bit sequence to be the preset value first, rather than directly performing function processing or the like on the original bit sequence (i.e., the first bit sequence) of the SCI. For example, it is assumed that the first bit sequence of the SCI includes 32 bits, in the embodiment, the specified field may consist of any number of multiple specified bits in the first bit sequence. The specified bits included in the specified field may be distributed in the first bit sequence discretely or continuously. In this example, the specified bits included in the specified field are preferably distributed continuously.

In the embodiment, the specified bits in the specified field are rewritten to be the preset value, regardless of specific original bit values of the specified bits. In a specific implementation, the preset value may be "0" or "1".

In Step S130, the check sequence is generated based on the second bit sequence generated from the first bit sequence.

In some embodiments, the Step S130 may include: querying a preset corresponding relationship with the second bit sequence being taken as a query basis, and obtaining the check sequence, which corresponds to the second bit sequence, in the corresponding relationship, for example, a CRC sequence corresponding to the second bit sequence.

In some other embodiments, the Step S130 may include: generating the check sequence such as a CRC sequence by function processing with the second bit sequence being taken as a generation basis and the second bit sequence as a variable.

In this case, even if the information carrying of the SCI changes, so that the change in the bit value of the specified field of the first bit sequence of the SCI carrying the control information will causes an error in generation of the check sequence, it is still possible to generate a second bit sequence which can be used to generate a correct check sequence by the rewriting operation in Step S120 of the present embodiment. In this case, on the one hand, the information carrying of the SCI can be improved and upgraded according to actual needs, and on the other hand, normal and correct generation of check sequence is ensured under the circumstance that the existing check sequence generation mechanism is compatible to the largest extent.

In some cases, the method further includes:

determining a type of the first bit sequence according to a bit value of each bit in the first bit sequence;

the method further includes:

when it is determined that the type of the first bit sequence is a first type, generating the check sequence such as a CRC sequence according to the first bit sequence; where, when the bit value of each bit in the specified field is the preset value, the first bit sequence is the first type, otherwise the first bit sequence may be considered as a second type which is different from the first type.

The Step S120 may include:

when the type of the first bit sequence is the second type, rewriting a bit whose value is not equal to the preset value in the specified filed to be the preset value to generate the second bit sequence.

As for determining the type of the first bit sequence, the following manners may be included:

determining, one by one, whether a bit value of each bit in the specified field is the preset value; and determining whether bit values of n preset bits in the specified field are the preset value. In communication, frequencies of effective use of bits in the specified field may be different. In the present embodiment, n specific bits are n bits having the highest frequency of use. When the specified field is a bit field in which bits are distributed continuously, bit values of first n bits in the specified field may be extracted. Therefore, the times for the determination can be reduced. If the bit values of the n bits are the preset value, there is a very large probability that bit values of the rest bits in the specified field are also the preset value, which can reduce the times for the determination and speed up the determination.

In some embodiments, the method further includes:

when the type of the first bit sequence is the second type and after extracting control information from the first bit sequence, setting the specified field of the first bit sequence to be the preset value to generate the second bit sequence; or when the type of the first bit sequence is the second type, copying the first bit sequence, rewriting a specified field of the copied first bit sequence to generate the second bit sequence.

In the implementation, generating the second bit sequence after the control information is extracted, or setting values of bits in the specified field of the copied first bit sequence, may avoid a control information extraction failure caused by setting the specified field of the first bit sequence under the conditions that the control information is not successfully extracted.

In some embodiments, the method further includes: distinguishing, based on an information format of the SCI, a reserved field and an information filed other than the reserved field, which are predefined; and the Step S120 may include: setting a bit in the reserved field of the first bit sequence to be the preset value to generate the second bit sequence.

In the information format of the SCI, the reserved field and the information filed are predefined. In the embodiment, the reserved field is a temporarily unused bit field that is intentionally reserved when the information format of the SCI is defined. The bit field is a set of bits consisting of one or more bits for indication. The information field is a set of bits consisting of bits that have been set for transmission of control information when the information format of the SCI is proposed.

In the embodiment, the specified field is the reserved field indicated in the information format of the SCI. In the embodiment, if the specified field is the reserved field, the preset value is "0". Therefore, Step S120 may include: replacing all bits, which correspond to the reserved field, in the first bit sequence with the preset value, for example, "0", to form a new bit sequence; and generating the CRC sequence based on the new bit sequence.

Figure 2:
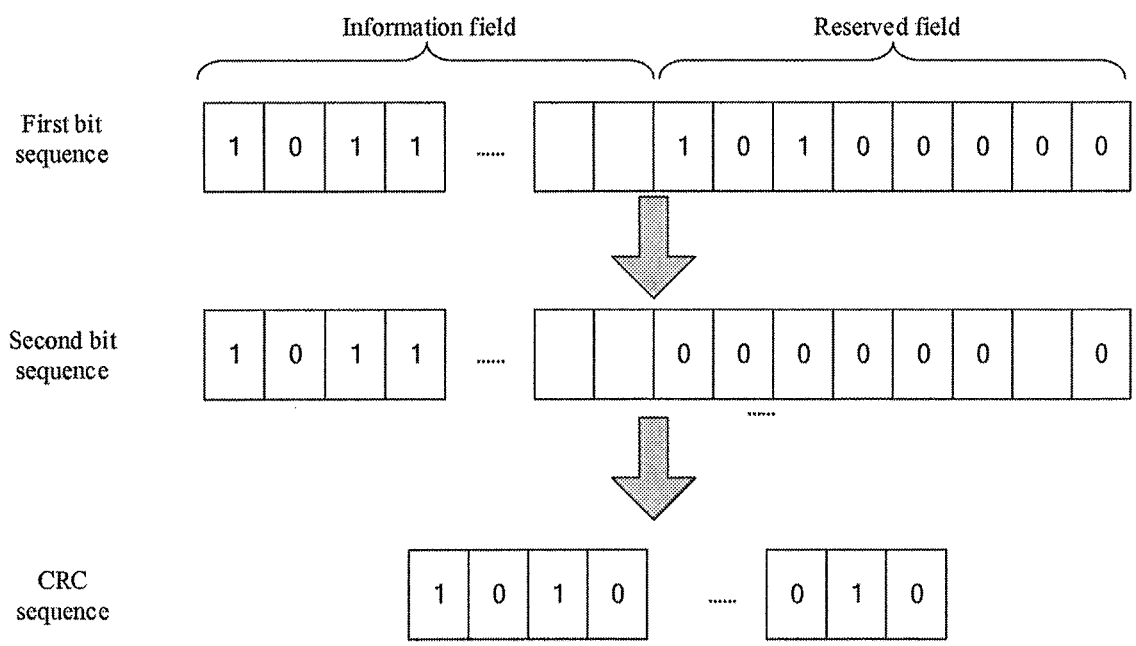
FIG. 2 is a schematic diagram of a change between sequences according to an embodiment of the present application.

As shown in FIG. 2, the first S1 bits of the first bit sequence are the information field, and the last S2 bits are the reserved field. After receiving the SCI, the terminal finds that a bit value of at least one bit in the reserved domain is not 0. The terminal generates the second bit sequence by performing Step S120. The check sequence is generated based on the second bit sequence by the setting operation on the preset value in Step S130.

According to FIG. 2, the second bit sequence remains unchanged with respect to the first bit sequence in terms of the information field, and all bits in the reserved field are rewritten to be a preset value "0". A CRC, which serves as one kind of check sequence, is generated directly based on the second bit sequence.

In some embodiments, the reserved field includes a first type of bit; and where the first type of bit is configured to indicate a transmission parameter for an end-to-end transmission.

The first type of bits herein can be one or more bits.

The transmission parameter may be a control parameter that controls transmission of traffic data in a subsequent PSSCH. The transmission parameter may be a transmission manner parameter and/or a transmission mode parameter.

Three optional indication bits of the first type are provided below with reference to different transmission parameters;

a first optional indication bit:

the first type of bits may include: an indication bit indicating whether to adopt diversity transmission. For example, if a bit value of a corresponding bit is a first value, it is indicated that the diversity transmission is performed; and if the bit value of the corresponding bit is a second value, it is indicated that the diversity transmission is not performed. The first value is different from the second value. The number of the corresponding bit herein may be one or more. If the number of the corresponding bit is one, and the first value is "0", then the second value is "1"; if the number of the corresponding bit is one, and the first value is "1", then the second value is "0".

A second optional indication bit:

the first type of bit includes: an indication bit indicating whether to adopt a short transmission time interval (sTTI) transmission manner. Generally, when data transmission is performed by using the sTTI transmission manner, the used subframe includes no more than seven transmission symbols. In this case, a transmitting end simultaneously transmits the control information and traffic information, and a receiving end first needs to receive the control information, decodes the control information, and receives and decodes the traffic information according to the decoded control information. The smaller the number of transmission symbols included in one subframe is, the shorter the time for the receiving end to decode the control information, and then the smaller the delay of the traffic information received is, which can improve a receiving rate of the traffic information. In the embodiment, the first type of the bit may include: an indication bit indicating whether the sTTI is adopted for transmitting traffic information of a corresponding PSSCH, and if the sTTI is not adopted, the TTI may be adopted by default.

A third optional indication bit:
the first type of bits may further include: an indication bit indicating a transmission mode adopted.

For example, in a V2X communication, two transmission modes are defined, which are a first transmission mode and a second transmission mode, respectively.

A fourth optional indication bit:
the first type of bits may further include: an indication bit indicating a modulation and coding Scheme (MCS) table adopted.

Figure 3:
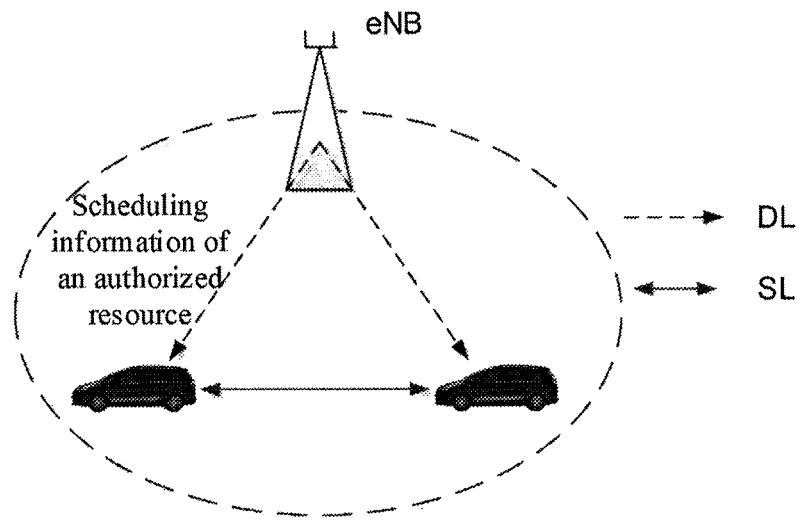
FIG. 3 is a schematic diagram of an interaction of a first transmission mode according to an embodiment of the present disclosure.

As shown in FIG. 3, the first transmission mode refers to that: a transmission resource of an on-board terminal is allocated by a base station, and the on-board terminal performs data transmission on a side-link according to the resource allocated by the base station; the base station may allocate to the terminal a resource for single transmission, and may also allocate to the terminal a resource for semi-static transmission. The first mode in the embodiment may be mode 3 in the Rel-14.

Figure 4:
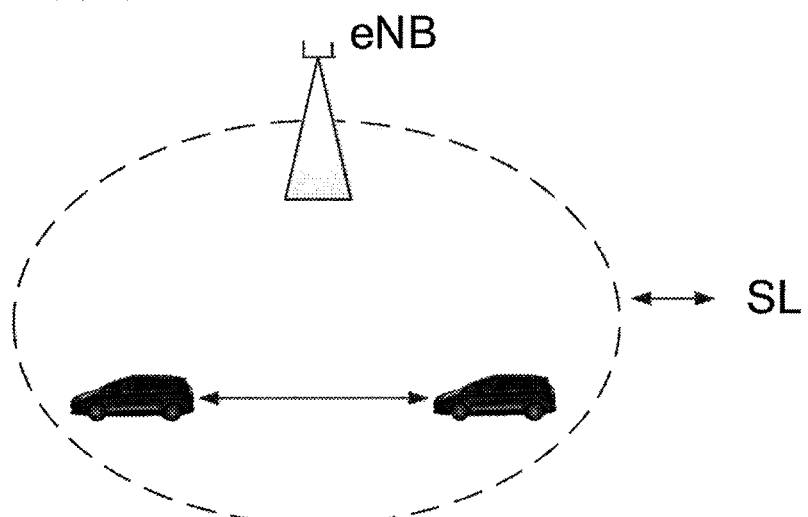
FIG. 4 is a schematic diagram of an interaction of a second transmission mode according to an embodiment of the present disclosure.

As shown in FIG. 4, the second transmission mode refers to that: the on-board terminal adopts a transmission mode of interception and reservation. The on-board terminal obtains a set of available transmission resources in a resource pool by means of interception, and the terminal randomly selects one resource from the set for data transmission. Since a traffic in a vehicle networking system has periodic characteristics, the terminal usually adopts a semi-static transmission manner, that is, after selecting one transmission resource, the terminal continuously uses the resource in multiple transmission cycles, thereby reducing a probability of a resource reselection and a resource conflict. The terminal carries in the control information of the current transmission the information about a reserved resource used for a next transmission, so that other terminals can determine whether the resource is reserved and used by the terminal by detecting the control information transmitted by the terminal, thereby reducing the resource conflict. The second mode in the embodiment may be mode 4 in the Rel-14.

Certainly, the first type of bits may include one or more of the first optional indication bit, the second optional indication bit, the third optional indication bit, and the fourth optional indication bit; and the above only serves as an example. In specific implementation, the application is not limited to the above four optional indication bits.

In FIG. 3 and FIG. 4, downlink (DL) represents a downlink of the base station (for example, an evolved base station (eNB), and a downlink control signal transmitted by the downlink carries scheduling information of an authorized resource in the first mode. In FIG. 3 and FIG. 4, side-link (SL) represents a side-link for end-to-end data transmission and reception.

Figure 5:
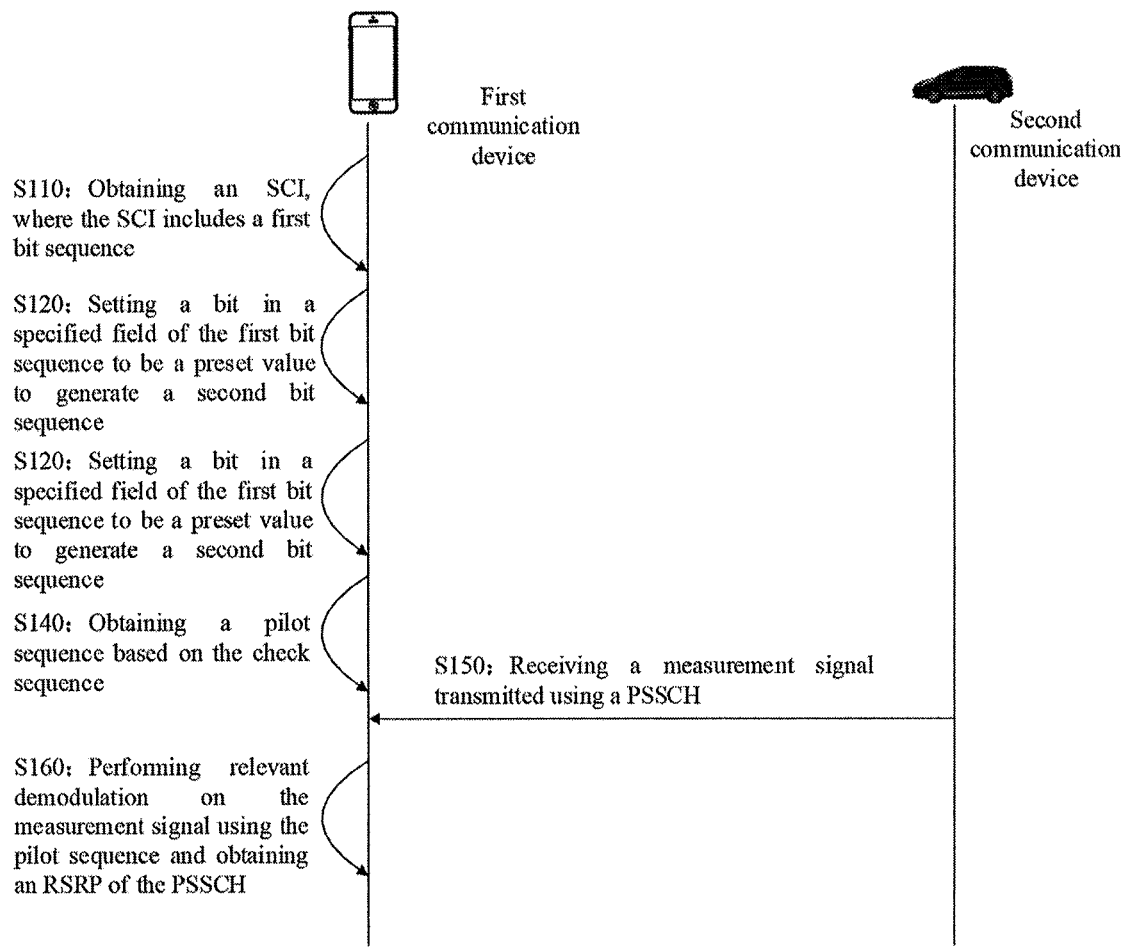
FIG. 5 is a schematic flowchart of another information processing method according to an embodiment of the present disclosure.

As shown in FIG. 5, the processing method further includes:
Step S140: obtaining a pilot sequence based on the check sequence, where the pilot sequence is configured for channel measurement of a physical side-link shared channel.

In some embodiments, the terminal may, according to a corresponding relationship between the CRC sequence and the pilot sequence, query the corresponding relationship to obtain the pilot sequence.

In other embodiments, the terminal may generate the pilot sequence by function processing with the CRC sequence being taken as a variable.

In the embodiment, the pilot sequence is a pilot sequence that is obtained by the terminal by local generation or local query. The pilot sequence may be a demodulation reference signal (DMRS) sequence corresponding to the DRMS.

The terminal performs channel measurement on a received signal received from the PSSCH using the pilot sequence, and obtains a reception quality, for example, obtaining a reference signal received power (RSRP) by correlation calculation. Of course, in a specific implementation, the pilot signal is not limited to the DRMS sequence, and may also be a reference sequence of another reference signal.

Accordingly, as shown in FIG. 5, the method may further include:
Step S150: receiving a measurement signal transmitted using a PSSCH; and
Step S160: performing relevant demodulation on the measurement signal using the pilot sequence and obtaining a RSRP of the PSSCH.

In some embodiments, when the check sequence generated by the foregoing method is a first check sequence, the method in the embodiment further includes:
generating a second check sequence using the first bit sequence;
checking the SCI using the second check sequence; and
transmitting the SCI and the second check sequence.
Normally, the second check sequence, for example, a CRC sequence, is added to an end of the SCI for transmission.

In some other embodiments, when the check sequence generated by the foregoing method is a first check sequence, the method in the embodiment further includes:
generating a second check sequence by using the first bit sequence; and
scrambling data of a PSSCH using the second check sequence.

For example, the traffic data transmitted using the PSSCH is scrambled using the second check sequence, thus the security of the traffic data of the PSSCH is improved.

Figure 6:
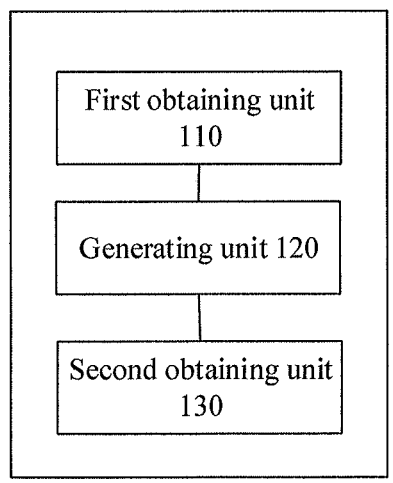
FIG. 6 is a schematic structural diagram of a communication terminal according to an embodiment of the present disclosure.

As shown in FIG. 6, the embodiment provides a communication device, where the communication device may be a transmitting end in an end-to-end communication and includes:
a first obtaining unit 110, configured to obtain a SCI, where the SCI includes a first bit sequence;
a generating unit 120, configured to set a bit in a specified field of the first bit sequence to be a preset value to generate a second bit sequence; and
a second obtaining unit 130, configured to obtain a check sequence based on the second bit sequence.

The communication device provided in the embodiment may be various communication devices in the end-to-end communication, for example, a mobile terminal, or a road-side communication unit or the like.

The first obtaining unit 110, the generating unit 120, and the second obtaining unit 130 may each correspond to a processor; the processor may include: an application processor (AP), a central processing unit (CPU), a digital signal processor (DSP) or a field programmable gate array (FPGA), a microprocessor unit (MPU), an application specific integrated circuit (ASIC). The processor may implement the obtaining of the SCI, the generation of the second bit sequence, and the generation of the check sequence such as a CRC sequence by implementation of a computer executable instruction such as a computer program.

In some embodiments, the communication device further includes:

a distinguishing unit, configured to distinguish, based on an information format of the SCI, a reserved field and an information field other than the reserved field, which are predefined;

the generating unit 120 is configured to set a bit in a reserved field of the first bit sequence to be the preset value to generate the second bit sequence.

In the embodiment, the distinguishing unit may also correspond to the processor, and may distinguish the reserved field and the information field by comparing the first bit sequence of the currently received SCI with the information format of the SCI.

In some embodiments, the communications device further includes:

an extracting unit, configured to extract a first type of bit from the reserved field; where the first type of bit is configured to indicate a transmission parameter for an end-to-end transmission.

The extracting unit herein may also correspond to the processor, and the first type of bit is extracted from a corresponding position with execution of the computer program. Then the control information corresponding to the bit value is obtained with reference to a provision of a communication protocol or the like and the bit value of the first type of bit.

In some embodiments, the first type of bit includes at least one of: an indication bit indicating whether to adopt diversity transmission; an indication bit indicating whether to adopt a short transmission time interval transmission manner; an indication bit indicating a transmission mode adopted; an indication bit indicating a MCS table adopted.

In a specific implementation, the first type of bit is not limited to one or a combination of the above four indication bits, and may also be indication bits indicating other transmission parameters.

In some embodiments, the communications device further includes:

a third obtaining unit, configured to obtain a pilot sequence based on the check sequence, where the pilot sequence is configured for channel measurement of a physical side-link shared channel.

The communication device in the embodiment further includes: the third obtaining unit, which may also correspond to the processor, and may obtain the pilot sequence or the like based on the generated CRC sequence.

In some embodiments, the communicating device further includes:

a checking unit, configured to check the SCI using a second check sequence generated based on the first bit sequence; and a transmitting unit, configured to transmit the SCI and the second check sequence when the SCI passes the check.

The checking unit can also be a processor, and can check the SCI using the check sequence with execution of the computer program.

The transmitting unit may correspond to a transceiving antenna and may be configured for information interaction between the communication device and other communication devices.

In some embodiments, the communicating device further includes:

a scrambling unit, configured to scramble data of a physical side-link shared channel PSSCH using a second check sequence generated based on the first bit sequence.

In the embodiment, the scrambling unit may also correspond to the processor, and may be configured to scramble the data of the PSSCH.

When the communication device is a transmitting device, the first obtaining unit 110 is configured to generate the SCI. When the communication device is a receiving device, the first obtaining unit 110 is configured to receive the SCI from a transmitting device.

Figure 7:
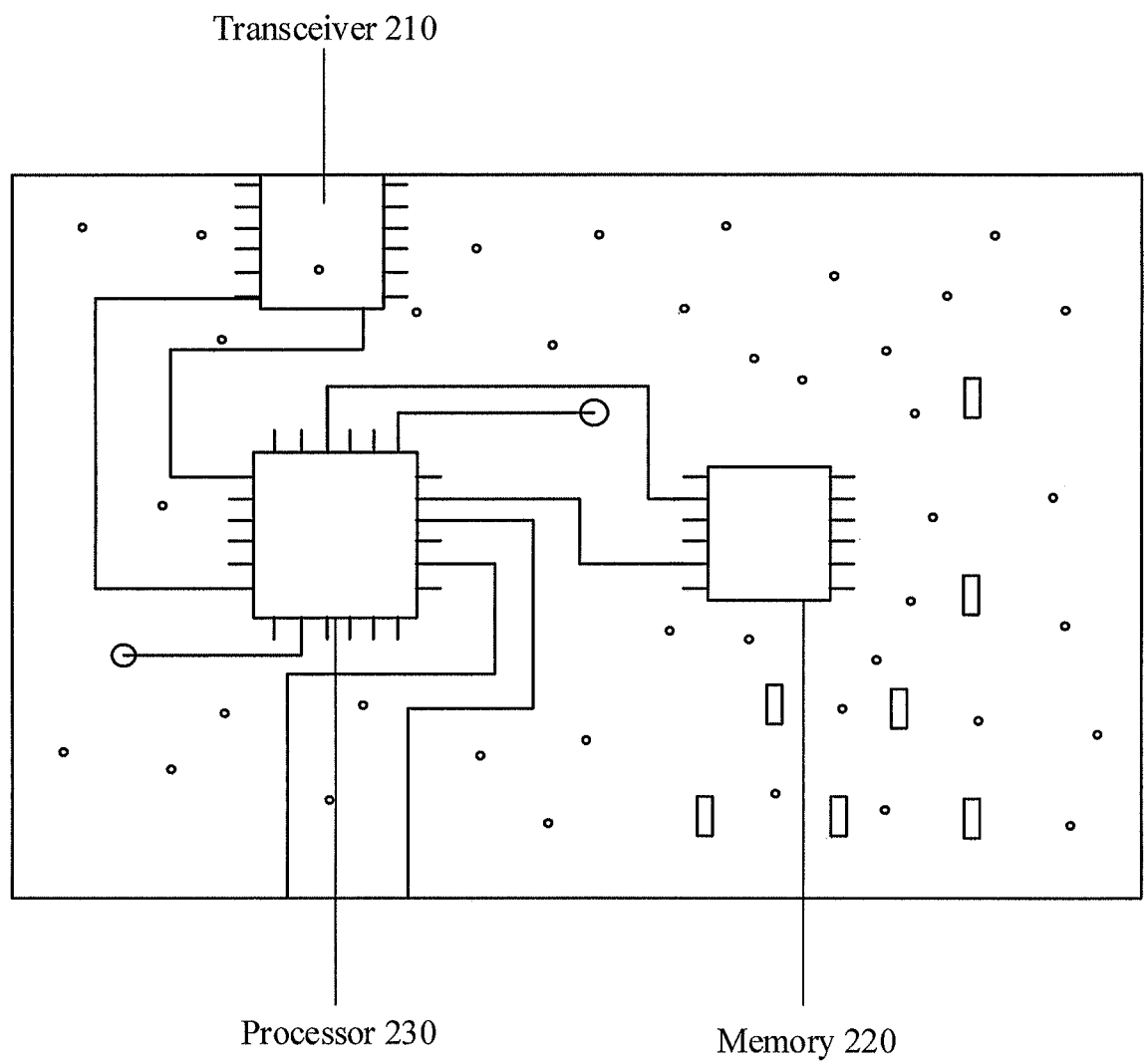
FIG. 7 is a schematic structural diagram of another communication terminal according to an embodiment of the present disclosure.

As shown in FIG. 7, the embodiment provides a communication device, including: a transceiver 210, a memory 220, a processor 230, and a computer program stored on the memory 220 and executed by the processor 230;

where the processor is respectively connected to the transceiver and the memory, and is configured to control information transmission and reception of the transceiver and information storage of the memory, and implement the information processing method provided by one or more of the foregoing technical solutions, for example, the information processing method shown in FIG. 1, FIG. 2, and FIG. 4.

The transceiver 210 may correspond to a transceiving antenna of the communication device.

The memory 220 may include various types of storage medium. The storage medium may at least include: a non-volatile storage medium partially configured for storing the computer program.

The processor 230 may be connected to the transceiver 210 and the memory 220 via an integrated circuit bus or the like.

The processor 230 can be a CPU, a micro controller unit (MCU), an AP, a DSP, a programmable logic controller (PLC), an ASIC, or the like.

The processor 230 may perform the following operations by executing the computer program: obtaining a side-link control information SCI, where the SCI includes a first bit sequence; setting a bit in a specified field of the first bit sequence to a preset value to generate a second bit sequence; obtaining a check sequence based on the second bit sequence.

In still other embodiments, the processor 230 may further be configured to perform the following operations: distinguishing, based on an information format of the SCI, a reserved field and an information filed other than the reserved field, which are predefined; and setting a bit in the reserved field of the first bit sequence to be the preset value to generate the second bit sequence.

The reserved field includes a first type of bit, where the first type of bit is configured to indicate a transmission parameter of an end-to-end transmission. The first type of bit includes at least one of: an indication bit indicating whether to adopt diversity transmission; an indication bit indicating whether to adopt a short transmission time interval transmission manner; an indication bit indicating a transmission mode adopted.

Additionally, the processor 230 can be configured to perform the following operations: obtaining a pilot sequence based on the check sequence, where the pilot sequence is configured for channel measurement of a physical side-link control channel.

In some embodiments, the processor 230 is configured to check the SCI using the check sequence; and transmit the check sequence and the SCI after the SCI passes the check.

In some other embodiments, the processor 230 is configured to scramble data of a physical side-link shared channel PSSCH using a CRC sequence.

The embodiment of the present application further provides a computer storage medium, where the computer storage medium stores a computer program therein; and the computer program, after executed by the processor, can implement the information processing method provided by the forgoing one or multiple technical solutions, e.g., the method as shown in FIG. 1, FIG. 2 and FIG. 4.

The computer storage medium provided by the embodiment of the present application includes: various medium that can store a program code, such as a mobile storage device, a read-only memory (ROM), a random access memory (RAM), a magnetic disk, or an optical disk or the like. In some embodiments, the computer storage medium may be a non-volatile storage medium.

A specific example is provided below with reference to any of the above embodiments:

Example 1

In this example, a CRC sequence generated using the same information field as a PSCCH in Rel-14 communication standards, and a DMRS sequence of a PSSCH corresponding to the CRC sequence is generated using the CRC sequence.

If it is necessary to occupy the indication transmit diversity and/or sTTI and/or transmission mode in SCI format 1, in order to enable a terminal of Rel-14 to detect a new SCI carried on the PSCCH, a feasible solution is to use reserved bits in a reserved field in SCI format 1 to represent physical meanings of transmit diversity and/or sTTI and/or transmission mode or the like. For example, a reserved bit is used to distinguish whether to use the transmit diversity, and a reserved bit is used to distinguish different transmission modes.

The new SCI multiplexes the reserved bits in SCI format 1 and is configured to represent a new physical meaning, but a CRC sequence is still generated using a case where the reserved bits are set to be "0", and the DMRS sequence of the PSSCH is generated using the CRC sequence.

In the several embodiments provided by the present application, it should be understood that the disclosed apparatus and method may be implemented in other manners. The device embodiments described above are merely illustrative. For example, the division of the unit is only a logical function division. In actual implementation, there may be another dividing manner, such as: multiple units or components may be combined, or may be integrated into another system, or some features can be ignored or not executed. In addition, the coupling, or direct coupling, or communication connection between the components shown or discussed may be indirect coupling or communication connection through some interfaces, devices or units, and may be electrical, mechanical or in other forms.

The units described above as separate components may or may not be physically separated, and the components displayed as the unit may or may not be physical units, that is, the units may be located in one place or distributed to multiple network units; some or all of the units may be selected according to actual needs to achieve the purpose of the solution of the embodiment.

In addition, each functional unit in each embodiment of the present disclosure may be integrated into one processing module, or each unit may be separately used as one unit, or two or more units may be integrated into one unit; the above integrated unit can be implemented in the form of hardware or in the form of hardware and software functional units.

A person skilled in the art can understand that all or part of the steps for implementing the above method embodiments may be completed by using hardware related to the program instructions. The foregoing program may be stored in a computer readable storage medium, and when the program is executed, the steps of the above method embodiments are performed.

The above is only the preferred embodiment of the present application and is not intended to limit the protection scope of the present application. Modifications made in accordance with the principles of this application are to be understood as falling within the protection scope of the present application.

INDUSTRIAL PRACTICABILITY

In the embodiments of the present application, in order to solve the problem of a failure in normally and correctly generating a check code caused by a possible change in an information carrying of a SCI, a value of a bit in a specified field of an original first bit sequence of the SCI is set to generate a second bit sequence, in which bits of a specified field thereof are a preset value, and a check sequence is generated based on the second bit sequence. In this way, a problem of an abnormality and error in generation of the check sequence caused after data is written into the specified field of the SCI is solved, and thus a positive industrial effect is achieved. In addition, a transmitting end of the SCI can be controlled by a computer executable code such as a computer program to perform the generation of the second bit sequence, and the check sequence is thus generated successfully and correctly using the second bit sequence, thereby characteristics such as an excellent achievability and a wide industrial practicability are achieved.

What is claimed is:

1. An information processing method for use in a communication device, comprising:
   obtaining a side-link control information (SCI), wherein the SCI comprises a first bit sequence;
   setting a bit in a specified field of the first bit sequence to be a preset value to generate a second bit sequence; and
   obtaining a check sequence based on the second bit sequence;
   wherein the method further comprises:
   distinguishing, based on an information format of the SCI, a reserved field and an information field other than the reserved field, which are predefined; and
   the setting the bit in the specified field of the first bit sequence to be the preset value to generate the second bit sequence comprises:
   setting a bit in the reserved field of the first bit sequence to be the preset value to generate the second bit sequence.

2. The method according to claim 1, wherein the reserved field comprises a first type of bit; and
   wherein the first type of bit is configured to indicate a transmission parameter for an end-to-end transmission.

3. The method according to claim 2, wherein the first type of bit comprises at least one of:
   an indication bit indicating whether to adopt diversity transmission;
   an indication bit indicating whether to adopt a short transmission time interval transmission manner;
   an indication bit indicating a transmission mode adopted; and
   an indication bit indicating a modulation and coding scheme (MCS) table adopted.

4. The method according to claim 1, wherein the method further comprises:

obtaining a pilot sequence based on the check sequence, wherein the pilot sequence is configured for channel measurement of a physical side-link shared channel.

5. The method according to claim 1, wherein the obtaining the SCI comprises:
generating the SCI when the communication device is a transmitting device.

6. The method according to claim 1, wherein the obtaining the SCI comprises:
receiving the SCI from a transmitting device when the communication device is a receiving device.

7. The method according to claim 1, wherein when the check sequence is a first check sequence, the method further comprises:
generating a second check sequence using the first bit sequence;
checking the SCI using the second check sequence; and
transmitting the SCI and the second check sequence.

8. The method according to claim 1, wherein when the check sequence is a first check sequence, the method further comprises:
generating a second check sequence by using the first bit sequence; and
scrambling data of a physical side-link shared channel (PSSCH) using the second check sequence.

9. A communication device, comprising:
a memory, a processor, and a computer program stored on the memory and operable on the processor,
wherein the processor, when running the computer program, is configured to:
obtain a side-link control information (SCI), wherein the SCI comprises a first bit sequence;
set a bit in a specified field of the first bit sequence to be a preset value to generate a second bit sequence; and
obtain a check sequence based on the second bit sequence;
wherein the processor is further configured to:
distinguish, based on an information format of the SCI, a reserved field and an information field other than the reserved field, which are predefined, and
set a bit in the reserved field of the first bit sequence to be the preset value to generate the second bit sequence.

10. The communication device according to claim 9, wherein the processor is further configured to: extract a first type of bit from the reserved field; wherein the first type of bit is configured to indicate a transmission parameter for an end-to-end transmission.

11. The communication device according to claim 10, wherein the first type of bit comprises at least one of:
an indication bit indicating whether to adopt diversity transmission;
an indication bit indicating whether to adopt a short transmission time interval transmission manner;
an indication bit indicating a transmission mode adopted; and
an indication bit indicating a modulation and coding scheme (MCS) table adopted.

12. The communication device according to claim 9, wherein the processor is further configured to:
obtain a pilot sequence based on the check sequence, wherein the pilot sequence is configured for channel measurement of a physical side-link shared channel.

13. The communication device according to claim 9, wherein the communication device is a transmitting device; the processor is configured to generate the SCI.

14. The communication device according to claim 9, wherein the communication device is a receiving device, the processor is configured to receive the SCI from a transmitting device.

15. The communication device according to claim 9, wherein the processor is configured to:
check the SCI using a second check sequence generated based on the first bit sequence; and
transmit the SCI and the second check sequence when the SCI passes the check.

16. The communication device according to claim 9, wherein the processor is configured to:
scramble data of a physical side-link shared channel (PSSCH) using a second check sequence generated based on the first bit sequence.

17. A computer storage medium, wherein the computer storage medium stores a computer program therein; and the computer program, after executed by a processor, can implement an information processing method, comprising:
obtaining a side-link control information (SCI), wherein the SCI comprises a first bit sequence;
setting a bit in a specified field of the first bit sequence to be a preset value to generate a second bit sequence;
obtaining a check sequence based on the second bit sequence;
wherein the method further comprises:
distinguishing, based on an information format of the SCI, a reserved field and an information field other than the reserved field, which are predefined; and
the setting the bit in the specified field of the first bit sequence to be the preset value to generate the second bit sequence comprises:
setting a bit in the reserved field of the first bit sequence to be the preset value to generate the second bit sequence.

* * * * *

UNITED STATES PATENT AND TRADEMARK OFFICE
CERTIFICATE OF CORRECTION

PATENT NO.       : 10,959,214 B2
APPLICATION NO.  : 16/353883
DATED            : March 23, 2021
INVENTOR(S)      : Hai Tang Page 1 of 1

It is certified that error appears in the above-identified patent and that said Letters Patent is hereby corrected as shown below:

On the Title Page

(71) Applicant:
"GUANGDONG OPPO MOBILE TELECOMMUNICATIONS CORP., LTD., Guangdong (CN)"
Should read as:
--GUANGDONG OPPO MOBILE TELECOMMUNICATIONS CORP., LTD., Dongguan, Guangdong (CN)--

(73) Assignee:
"GUANGDONG OPPO MOBILE TELECOMMUNICATIONS CORP., LTD., Guangdong (CN)"
Should read as:
--GUANGDONG OPPO MOBILE TELECOMMUNICATIONS CORP., LTD., Dongguan, Guangdong (CN)--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*